J. VANNETTE.
LAWN MOWER.
APPLICATION FILED MAY 15, 1920.

1,412,583.

Patented Apr. 11, 1922.

INVENTOR
Jasper Vannette
BY
HIS ATTORNEY

J. VANNETTE.
LAWN MOWER.
APPLICATION FILED MAY 15, 1920.

1,412,583.

Patented Apr. 11, 1922.
4 SHEETS—SHEET 3.

INVENTOR
Jasper Vannette

HIS ATTORNEY

J. VANNETTE.
LAWN MOWER.
APPLICATION FILED MAY 15, 1920.

1,412,583.

Patented Apr. 11, 1922.
4 SHEETS—SHEET 4.

Inventor.
Jasper Vannette
by Chas. F. Dane
Atty

UNITED STATES PATENT OFFICE.

JASPER VANNETTE, OF TIFFIN, OHIO, ASSIGNOR OF ONE-THIRD TO VERNE V. VANNETTE AND ONE-THIRD TO ADAIR B. VANNETTE, BOTH OF TIFFIN, OHIO.

LAWN MOWER.

1,412,583.      Specification of Letters Patent.      Patented Apr. 11, 1922.

Application filed May 15, 1920. Serial No. 381,531.

*To all whom it may concern:*

Be it known that I, JASPER VANNETTE, a citizen of the United States, and a resident of Tiffin, in the county of Seneca and State of Ohio, have invented certain new and useful Improvements in Lawn Mowers, of which the following is a specification.

The invention relates to mowers of the front cut type, and has for its object to provide a simple and efficient machine of the character indicated in which practically all of the operating mechanism, except the handle and the ground roller, is confined within the space between the ground wheels so that the cutting operation may be effected close up to obstructions such as walls, trees, and the like, and this without danger of damaging any of the operating parts, the device involving relatively few and simple coordinated parts that are readily accessible for adjustment and repairs, and all of the gearing and bearings being housed against the ingress of foreign material which would tend to clog the machine. To this end the invention, in a preferred form thereof, comprises a main frame consisting of laterally spaced side members on each of which is journalled one of the ground wheels and to which the handle is rigidly connected; a secondary or auxiliary frame pivotally connected with said main frame at the forward portion thereof and comprising side members arranged in substantial parallelism with the corresponding members of the main frame and forming therewith and the adjacent faces of the ground wheels a housing for the bearings and gearing of the machine, in which secondary frame is journalled the cutter reel and the ground roller, the axis of the former being located in advance of the axis of the ground wheels and the roller being located to the rear thereof; duplex gears journalled on studs carried by the side members of the main frame and each arranged with one gear member thereof meshing with an internal gear on the adjacent ground wheel and with the other gear member meshing with a gear on the end of the cutter reel shaft; and a ledger blade or stationary knife for cooperation with the cutter reel, adjustably carried by the side members of the auxiliary frame in advance of the ground roller.

The invention is illustrated in the accompanying drawings, in which:—

Figure 1:
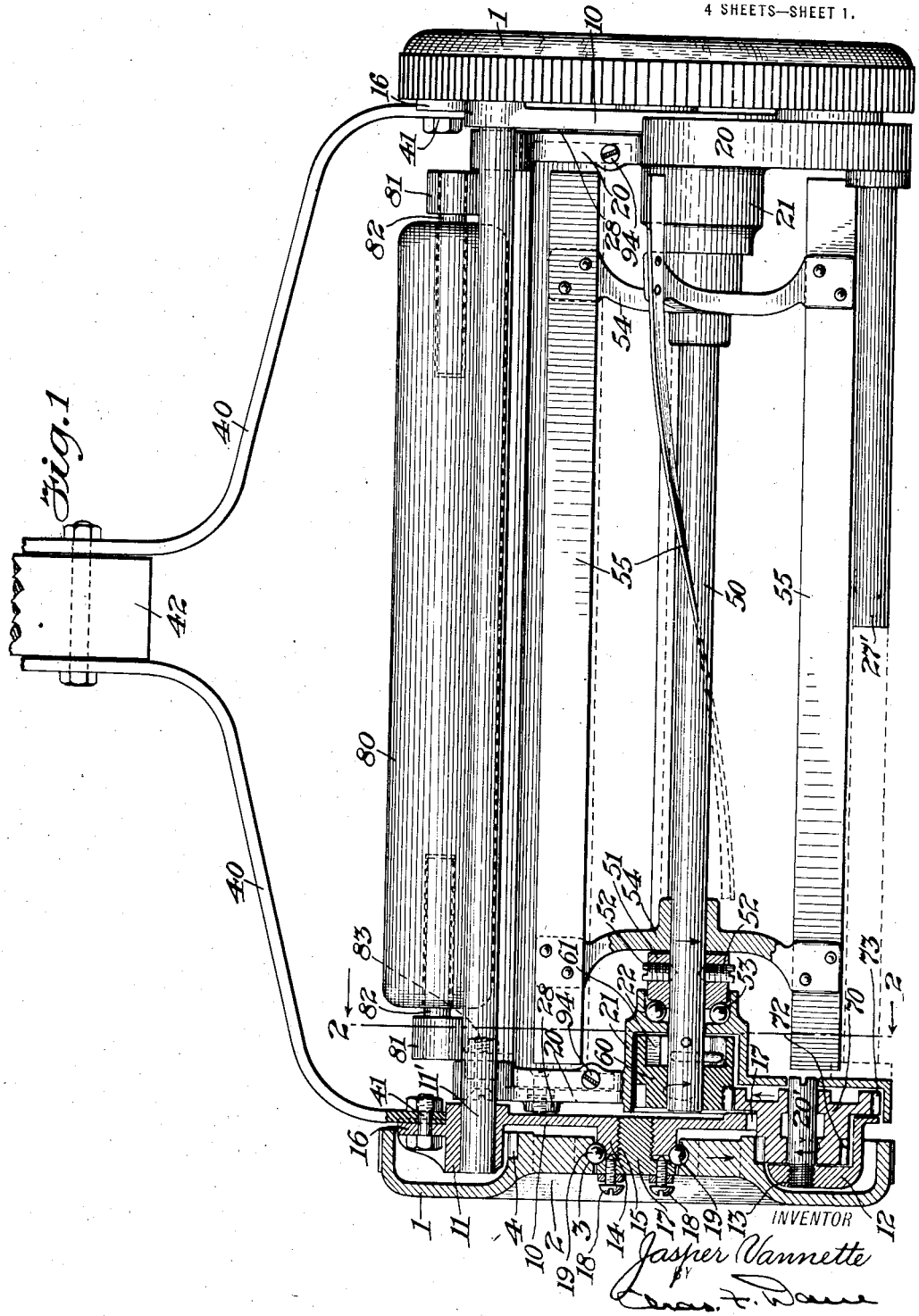
Fig. 1 is a plan view of the machine with one end in horizontal section on line 1—1 of Fig. 3.

Referring to the drawings, 1, 1 indicates two ground wheels which are centrally recessed or concaved so as to present rounded surfaces near their peripheries for contact with any obstruction and to shield the adjustable bearing members which occupy the central depressions 2, 2 of said wheels. The hub portion of each of said ground wheels is provided with a race-way 3 to constitute one element of a ball bearing journal for the wheels. The inner faces of the wheels are provided with annular recesses into which certain of the operating elements of the mower project, said recesses serving as partial housings for the parts aforesaid. The inner peripheral edge of the recessed portion of each wheel is provided with gear teeth 4 which constitute the main driving gear of the apparatus.

Figure 4:
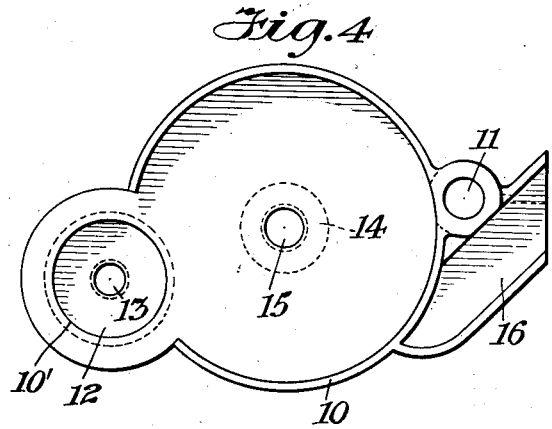
Fig. 4 is a side elevation of one of the side plates of the main frame.
Figure 5:
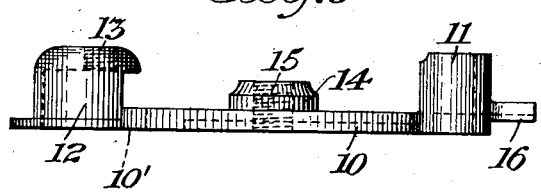
Fig. 5 is an edge view of the same.

The main frame of the machine includes two side plates or castings 10, 10, shown in detail in Figs. 4 and 5, each provided with a hollow boss 11, adapted to receive the ends of a tie rod 11'. Substantially diametrically opposite the bosses 11, each side plate is provided with an enlarged circular opening 10' which is partially covered by a laterally projecting bracket or boss 12, provided with a screw-threaded opening 13 in axial alignment with the enlarged opening 10' in said plate. The main body portion of the plate 10 is generally circular and is provided with a reenforcing marginal flange. The central portion of each plate is provided with an internally screw-threaded boss 14, the outer edge of which is machined to form one half of a stationary raceway, co-operating with the raceway 3 in the hub of the corresponding ground wheel. Engaging the screw-threaded central opening 15 in each of the plates 10, is a stud 17 which carries the other half of the stationary raceway, shown as formed on the inner peripheral edge of its head, so that when said stud is set up in the boss 14, the anti-friction balls 19 are properly enclosed in the complete raceway constituted by the member 3 thereof in the hub of the ground wheel, and the second half formed on the end of the boss 14 and the head of the stud 17. In order to accurately adjust and lock the stud 17 in position, so as to permit free action of the balls 19 without undue lost motion of the latter, each stud 17 is provided with set screws 18 passing through the head of the stud and engaging the ends of the boss 14, each of said set screws being provided with a suitable lock nut to hold it in adjusted position.

The rear portion of each of the side members 10 of the main frame is provided with a substantially tangential socket member 16 adapted to receive the end of the corresponding bail member 40, to which the handle 42 is secured, the said socket members 16 projecting rearwardly and upwardly from the plates to insure the proper inclination of the handle of the machine, each of the bails being rigidly secured in the corresponding socket by means of a bolt 41.

Figure 2:
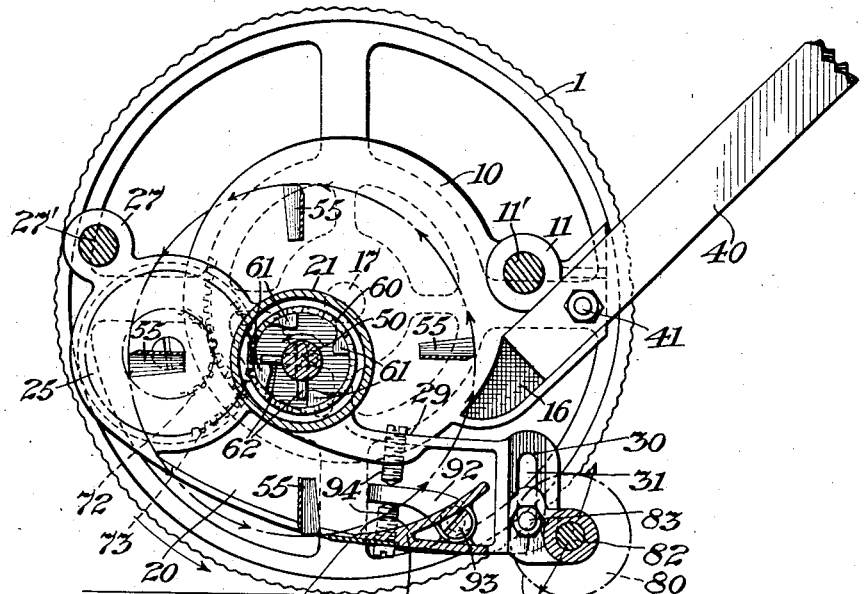
Fig. 2 is a vertical section on the line 2—2 of Fig. 1.
Figure 3:
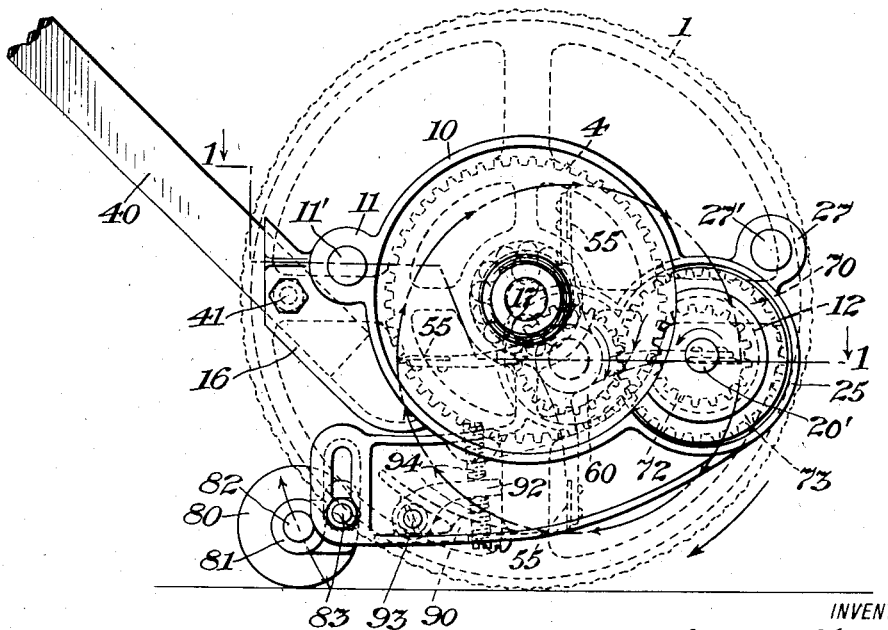
Fig. 3 is a side elevation with the ground wheels shown in dotted lines.
Figure 6:
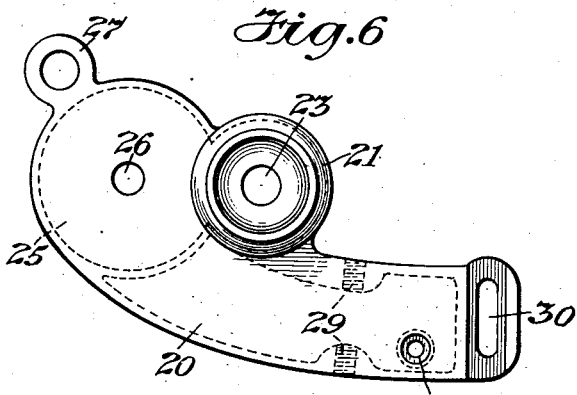
Fig. 6 is a side elevation of one of the auxiliary frame members.
Figure 7:
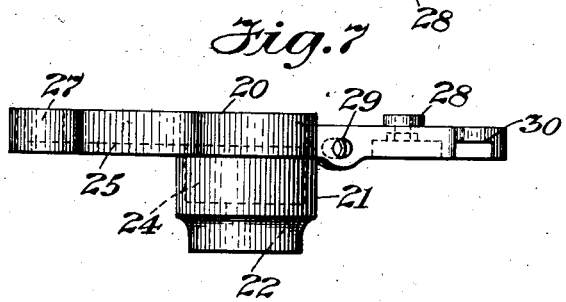
Fig. 7 is an edge view thereof.

The secondary frame comprises two side plates or members 20, 20, which are located substantially parallel with the corresponding side members 10, 10, of the main frame, and are connected by a tie rod 27' engaging bosses or projections 27 on the forward upper edges of the plates 20, 20. Each of said members or plates 20, 20 is preferably of the general form shown in Figs. 6 and 7, and includes a generally cylindrical hollow boss 21 which projects on one side of the plate proper and is provided with an enlarged recess 24 in one end, and with a smaller recess, constituting an annular raceway 22, in the opposite end, the two recesses thus formed being divided by a wall provided with a central perforation 23, through which the shaft of the cutter reel passes. The cylindrical boss 21 is located substantially midway of the upper portion of the plate 20, which latter has a generally arcuate form terminating at one end in a flanged housing 25, which is centrally perforated, as at 26, to receive a stud 20' mounted in the boss or housing 12 on the main frame and serving as a fulcrum or pivotal support for the secondary frame on the main frame, that is to say, each of said plates 20 is pivoted to the main frame on the aligning studs 20' which, as shown, are mounted in horizonal alignment in the bosses 12 on the lower forward portions of the side members 10 of the main frame, so that the secondary frame is pivotally supported at its forward end to the forward end of the main frame and extends rearwardly and in trailing relation to the latter, as shown in Figs. 2 and 3. It will thus be seen that the secondary frame, consisting of the side members 20, 20, and the tie rod 27', is fulcrumed or pivotally connected to the corresponding side members 10, 10, of the main frame, upon each of which latter members one of the ground wheels is journalled, so that the secondary frame is free to move up and down relatively to the main frame and the ground wheels.

The movable cutting member or cutter reel comprises a shaft 50 which extends through the openings 23, 23, in the secondary frame. Adjustably fixed to said shaft near each end thereof is an annulus 51, the outer face of which constitutes the co-operating race-way for anti-friction balls 53 located in the fixed raceway 22. Each of the members 51 is adjustably clamped to the shaft by means of oppositely disposed set screws 52. Secured to the shaft 50 adjacent these members are spiders 54, at the outer ends of the arms of which are secured the rotary cutter knives 55 of usual type. On each end of the cutter reel shaft 50 is mounted a gear 60 which is adapted to mesh with the toothed section 73 of a duplex gear 70 mounted upon the stud 20', which latter is fast in the boss 12 of each main frame member 10, said duplex gear member having a second set of teeth 72 which engage the circular series of gear teeth 4 on the inside of the ground wheel, so that the rotation of the latter imparts rotary movement to the cutter reel, and as the ratio of the several gear members is an increasing one, the speed of the rotating cutter reel is much higher than that of the ground wheels. Each duplex gear member 70 projects through the circular opening 10' in the corresponding side plate 10 of the main frame which is opposite the boss or projection 12 thereon, and therefore is effectively housed by the boss aforesaid, the adjacent portions of the ground wheel, the plate 10 of the main frame, and the plate 20 of the secondary frame. Each of the gears 60 on the ends of the cutter reel shaft is enclosed and housed within the recess 24 in the boss 21 of the secondary frame, on the one hand, and by the adjacent wall of the plate 10 of the main frame on the other hand. It will thus be seen that all of the gears, including the teeth 4 on the inside of the ground wheel, are effectively protected against the entrance of foreign material.

Connection between the respective gears 60 and the shaft 50 of the cutter reel is effected by any of the usual types of pawl and ratchet mechanism which drives the cutter reel positively when the mower is moved in a forward direction, but which does not rotate the cutter reel when the mower is moved backwardly. In the particular embodiment of the apparatus illustrated, the connection consists of two loose pins 62, 62, passing through openings in the shaft 50 and engaging angular projections 61 on the interior of a recess in one face of the gear 60, said projections 61, four in number, each having one radial face and one inclined face so that when the gear is driven in one direction, the pins engaging the radial faces of adjacent projections will drive the cutter reel, but when the mower is reversed, and the gear 60 is rotated in the opposite direction, the ends of the pins will ride up the inclined faces of the projections and said pins will reciprocate idly in the openings in the shaft 50 without imparting any motion to the cutter reel shaft.

Co-operating with the knives 55 of the cutter reel, is a ledger bar or stationary knife, which may be of the usual type, and in the form shown, comprises a blade 91, secured in a V-shaped bar 90, provided near its ends with two forwardly extending arms 92, which are pivotally secured by bolts 93 in socket members 28 located toward the rear end of the side members 20, 20, of the secondary frame. The ledger bar is adjusted toward and from the path of travel of the cutting edges of the knives 55 by means of two set-screws 94, 94, passing through the edge flanges on the inside of the plates 20, 20, and engaging opposite faces of the arms 92, so that when one of said set-screws is backed off and the other is set up, the ledger bar will be rocked on its pivotal bearings whereby the edge of the knife or ledger bar will be moved toward or away from the path of movement of the cutting edges of the knives 55, as is usual in machines of this general character.

The ground roller 80 is of the usual form and is journalled on pins 82 carried by bracket members 81, adjustably secured to the rear ends of the frame members 20 by bolts 83 engaging vertical slotted guideways 30 in the ends of said frame members 20, so that the ground roller may be raised or lowered and thereby regulate the height of the ledger bar from the ground to determine the cut of the machine.

From the foregoing construction it will be apparent that the secondary frame which carries the cutter reel, the ledger bar, and the ground roller, may be quickly and accurately adjusted to vary the cut to any desired degree by simply adjusting the ground roller up or down in the slotted guides 30, and that, inasmuch as the secondary frame is pivoted on the axis of the intermediate gears 70 connecting the ground wheels and the cutter reel shaft, the adjustment of the secondary frame to vary the cut, will not, in any way, interfere with the proper meshing or co-operation of the gear train represented by the teeth 4 on the ground wheels, the teeth on the duplex pinions 70, and the teeth on the gears 60 mounted on the cutter reel shaft. It will also be noted that the disposition of the cutter reel and the ledger bar is such that the actual cutting operation is effected at a point in advance of the vertical plane through the axis of the ground wheels, so that the apparatus will permit the cutting operation to be carried close up to walls, trees and other obstructions. On the other hand, the operating mechanism being located substantially within the space defined by the ground wheels, said operating mechanism, including the knives, is effectively protected from contact with extraneous objects which tend to damage the same, by the ground wheels and the tie rod 27' of the secondary frame. It is also to be noted that the pivotal connection between the main frame and the secondary frame admits of the latter moving up and down freely so that the ground roller and the cutting knives follow the contour of the ground and enable the mower to effect a uniform cut where the ground is irregular or broken in character by elevations or depressions. This action may be made positive and certain by reason of the rigid connection of the handle with the main frame, for by elevating or depressing the handle the forward end of the secondary frame will be correspondingly lowered or raised, thereby moving the cutting knives towards or from the surface of the ground. The machine therefore possesses the capabilities of flexibility, balance and uniform cutting, coupled with the possibility of cutting close up to walls, trees, flowerbeds and other obstructions, without danger of damaging any of its operating elements.

Figure 8:
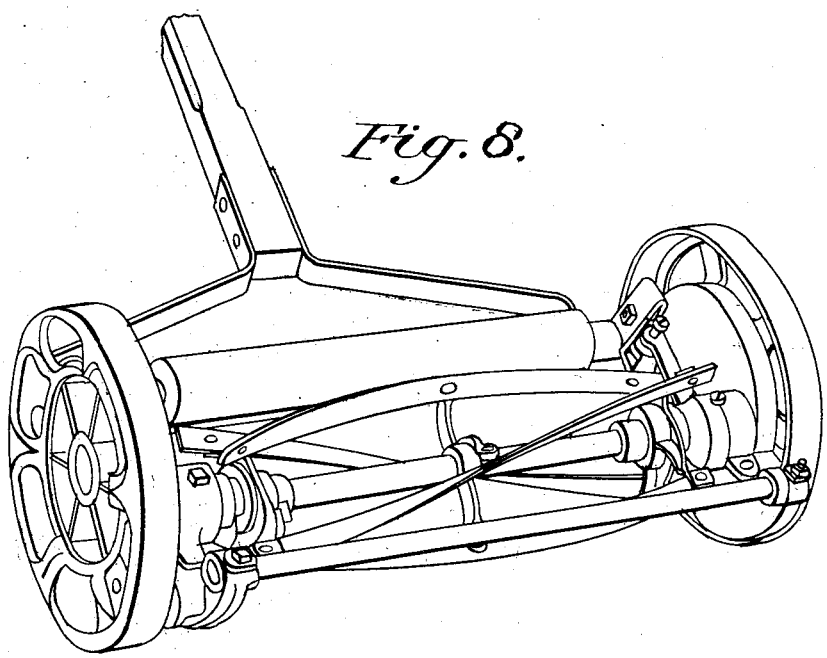
Fig. 8 is a perspective view showing the machine folded up for transportation.
Figure 9:
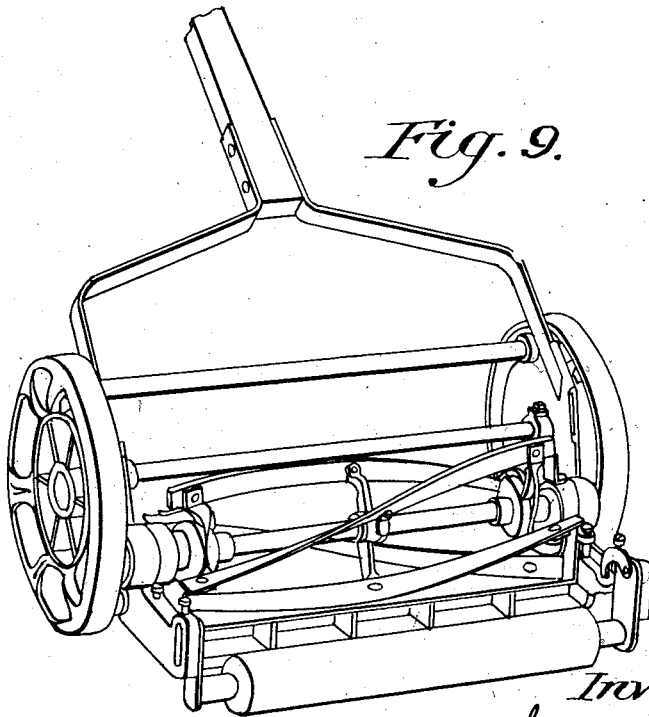
Fig. 9 is a side view showing the machine adjusted for rear cutting.

The flexibility of the machine, is additionally illustrated in Figs. 8 and 9, the former showing the machine folded up to permit it to be trundled from place to place, with the cutter reel and the ground roll elevated into inoperative position and lying wholly within the space between the ground wheels. To adjust the machine to the relation shown in Fig. 8, from the normal relation shown in the preceding figs., the operator places his foot against the ground roll and pulls back on the handle. The machine will then fulcrum on the ground roll until the ground wheels fall on the opposite side of the ground roll with their axis between the handle and the ground roll. The ground roll is then grasped with the hands and, together with the reel frame, is pulled upward and backward until the ground roll rests on the rear tie-rod. The operating parts of the mechanism are thus elevated out of the way of obstructions on the ground and the machine may be pulled after the operator much more easily than is possible with the older types of machines which are usually pushed ahead of the operator.

As illustrated in Fig. 9 the machine is adjusted as a rear-cut mower, adapted to be pulled toward the operator, which enables the cutting of terraces and irregular surfaces with ease and facility. In adjusting the machine to this particular relation, the handle is swung from the rear to the front, in which operation the intermediate gears, being connected with the short arm of the main frame to which the handle is connected, exercises a crank like action and pushes the auxiliary frame, that supports the reel, the ground knife, the ground roll, rearwardly of the axis of the ground wheels, but does not change the direction of motion of the reel. When in this position the apparatus becomes a rear-cut machine, with the handle projecting forwardly of the machine so that in the cutting operation the latter is pulled after the operator instead of being pushed as in the normal operation thereof. This adjustment renders the machine especially well adapted for cutting terraces, the machine being pushed backwardly up the grade as the reel is idling, and is then pulled downward when the reel is positively actuated to effect the cutting operation. This particular adjustment and mode of operation very materially reduces the labor of cutting terraces and the work is very much better done, inasmuch as, because of its great flexibility, the machine adapts itself to convex or concave surfaces perfectly thereby ensuring uniformity of cut. Furthermore, the downward pull on the handle is greatly assisted by gravity, thereby materially reducing the energy required to operate the machine.

What I claim is:

1. A lawn mower of the front cut type comprising a main frame, ground wheels journalled thereon, a secondary frame pivoted to the forward portion of the main frame and extending rearwardly of the latter, a cutter reel journalled in the secondary frame in advance of the ground wheel journals, and means for driving the cutter reel from the ground wheels.

2. A lawn mower of the front cut type comprising a main frame, ground wheels journalled thereon, a secondary frame pivoted to the forward portion of the main frame and extending rearwardly of the latter, a cutter reel journalled in the secondary frame in advance of the ground wheel journals, and gearing connecting the cutter reel with the ground wheels.

3. A lawn mower of the front cut type comprising a main frame, a rearwardly and upwardly extending handle rigidly attached thereto, ground wheels journalled on the main frame, a secondary frame pivoted to the forward portion of the main frame and extending rearwardly of the latter, a cutter reel journalled in the secondary frame in advance of the ground wheel journals, and gearing connecting the cutter reel with the ground wheels.

4. A lawn mower of the front cut type comprising a main frame, internally geared ground wheels journalled on the main frame, a secondary frame pivoted to the forward portion of the main frame and extending rearwardly of the latter, a cutter reel journalled in the secondary frame in advance of the ground wheel journals and having ratchet pinions thereon, and duplex gears journalled in the forward portion of the main frame meshing with the gears on the ground wheels and the cutter reel respectively.

5. A lawn mower of the front cut type comprising a main frame including two connected side members, ground wheels journalled in said side members and each having an internal gear rim, a duplex pinion journalled in each side member in advance of the ground wheel journals and meshing with the internal gear rim of the corresponding ground wheel, a secondary frame including two connected side members adjacent the side members of the main frame and fulcrumed on the main frame concentrically with the axis of the duplex gears, a rotary cutter reel journalled in said secondary frame, gears on the ends of the cutter reel shaft meshing with the duplex gears aforesaid, a ground roller supported in the secondary frame, and a stationary knife bar mounted between the secondary frame members.

6. A lawn mower of the front cut type comprising a main frame including two connected side members, ground wheels journalled in said side members, each having an internal gear rim, a duplex pinion journalled in each side member in advance of the ground wheel journals and meshing with the internal gear rim of the corresponding ground wheel, a secondary frame including two connected side members adjacent the side members of the main frame and fulcrumed on the journals of the duplex gears, a rotary cutter reel journalled in said secondary frame, gears on the ends of the cutter reel shaft meshing with the duplex gears carried by the main frame, a ground roller supported on said secondary frame, and a stationary knife bar adjustably mounted between the secondary frame members.

7. A lawn mower of the front cut type comprising a main frame including two plate like side members and a tie rod connecting the same, ground wheels journalled in the side members each having an internal gear rim protected by said side members, a duplex pinion journalled in each of said side members in advance of the ground wheel journals and meshing with the internal gear rim on the corresponding ground wheel, a secondary frame, including two side members adjacent the side members of the main frame, and fulcrumed on the journals of the duplex gear, a tie rod connecting the side members of the secondary frame, a rotary cutter reel journalled in said secondary frame, gears on the ends of the cutter shaft meshing with the duplex gears carried by the main frame, a ground roller supported on said secondary frame, and a stationary knife bar mounted between the secondary frame members.

8. A lawn mower of the front cut type comprising a main frame including two side members, a tie rod and a handle connecting said side members, ground wheels journalled on bosses projecting from said side members, each of said side members having an internal gear rim, a duplex pinion journalled in each side member in advance of the ground wheel journals meshing with the internal gear rim of the corresponding ground wheel, a secondary frame including two side members adjacent the side members of the main frame and fulcrumed on the journals of the duplex gears, a tie rod connecting the side members of the secondary frame, each of said secondary frame members having a hollow boss or projection constituting a gear housing and a journal bearing, a rotary cutter reel journalled in the bearings in said secondary frame, gears on the ends of the cutter shaft in said gear housings meshing with the duplex gears carried by the main frame, a ground roller supported on said secondary frame, and a stationary knife bar mounted between the secondary frame members.

9. A lawn mower of the front cut type, comprising a main frame including two connected plate-like side members connected by a tie rod and a handle attaching means, each side member having a central boss constituting a journal for a ground wheel, a circular opening in advance of the ground wheel journal and an overhanging bracket adjacent said opening, a journal pin mounted in said bracket concentric with said opening, ground wheels mounted on the central journals each having an internal gear rim, an intermediate duplex gear mounted on said journal pins, a secondary frame including two connected plate-like side members adjacent the side members of the main frame and fulcrumed on the journal pins of the duplex gears, each of said secondary frame side members having a recessed boss constituting a gear housing and a journal bearing, a cutter reel journalled in said bearing in the secondary frame members, gears on the ends of the cutter reel shaft meshing with the intermediate gears, and a stationary knife bar mounted between the secondary frame members; the side members of the main and secondary frames and the ground wheels being so disposed that they constitute enclosing housings for the several journals and gears.

Signed at Tiffin in the county of Seneca and State of Ohio this 10th day of May A. D. 1920.

JASPER VANNETTE.

Witnesses:
 EDNA GLICK,
 R. R. BOUR.